United States Patent
Jaquette et al.

(10) Patent No.: US 11,777,708 B2
(45) Date of Patent: Oct. 3, 2023

(54) SECURE ENCRYPTION OF PARTIAL BLOCKS

(71) Applicant: International Business Machines Corporation, Armonk, NY (US)

(72) Inventors: Glen Alan Jaquette, Tucson, AZ (US); Danny Harnik, Tel Mond (IL)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 17/490,480

(22) Filed: Sep. 30, 2021

(65) Prior Publication Data

US 2023/0111001 A1     Apr. 13, 2023

(51) Int. Cl.
*H04L 9/06* (2006.01)

(52) U.S. Cl.
CPC ........ *H04L 9/0618* (2013.01); *H04L 2209/20* (2013.01); *H04L 2209/30* (2013.01)

(58) Field of Classification Search
CPC .............. H04L 9/0618; H04L 2209/20; H04L 2209/30
See application file for complete search history.

(56) References Cited

U.S. PATENT DOCUMENTS

| | | | |
|---|---|---|---|
| 6,275,588 B1 | 8/2001 | Videcrantz et al. | |
| 7,826,614 B1 | 11/2010 | Kaniz et al. | |
| 8,677,123 B1 * | 3/2014 | McGregor, Jr. | H03M 7/30 |
| | | | 713/168 |
| 10,958,416 B2 | 3/2021 | Factor | |
| 2004/0131182 A1 * | 7/2004 | Rogaway | H04L 9/0637 |
| | | | 380/37 |
| 2008/0028203 A1 | 1/2008 | Sakai | |
| 2009/0003592 A1 * | 1/2009 | Hanai | H04N 7/1675 |
| | | | 380/29 |
| 2014/0201523 A1 | 7/2014 | Sato | |
| 2019/0363891 A1 | 11/2019 | Naito | |
| 2021/0021406 A1 | 1/2021 | Minematsu | |

FOREIGN PATENT DOCUMENTS

| | | |
|---|---|---|
| CA | 2831367 C | 2/2019 |
| WO | 2014084886 A1 | 6/2014 |

OTHER PUBLICATIONS

International Search Report and Written Opinion dated Nov. 28, 2022 from International Application No. PCT/IB2022/058148 filed Aug. 31, 2022.
Barthe et al., "Fully automated analysis of padding-based encryption in the computational model", Proceedings of the 2013 ACM SIGSAC conference on Computer & communications security, Jun. 2013, 50 pps.

(Continued)

*Primary Examiner* — Ellen Tran
(74) *Attorney, Agent, or Firm* — David K. Mattheis

(57) ABSTRACT

Encrypting data blocks by receiving blocks of compressed data, determining a size, in bytes, of the compressed data, appending a trailer to the compressed data, the trailer associated with the size in bytes of the compressed data, encrypting the compressed data and trailer, yielding encrypted data, where a header of the encrypted data comprises a number of complete encrypted data blocks, and providing the encrypted data to a user.

17 Claims, 4 Drawing Sheets

(56) References Cited

OTHER PUBLICATIONS

Chen et al., "Length Preserving Compression—Marrying Encryption with Compression", SYSTOR '21: Proceedings of the 14th ACM International Conference on Systems and Storage, Jun. 2021, Article No. 15, pp. 1-12.

Klima et al., "Strengthened Encryption in the CBC Mode." IACR Cryptol. ePrint Arch. 2002 (2002): 61, May 24, 2002, 5 pps.

Manger, "A chosen ciphertext attack on RSA optimal asymmetric encryption padding (OAEP) as standardized in PKCS# 1 v2. 0", CRYPTO 2001, LNCS 2139, pp. 230-238, 2001.

Mell et al., "The NIST Definition of Cloud Computing", National Institute of Standards and Technology, U.S. Department of Commerce, NIST Special Publication 800-145, Sep. 2011, 7 pages.

Sundaram et al., "Encryption and hash based security in Internet of Things", 2015 3rd International Conference on Signal Processing, Communication and Networking (ICSCN), IEEE, 2015, 6 pps.

Vadhan et al., "Public-Key Encryption in Practice", CS 120/CSCI E-177: Introduction to Cryptography, (2006), Nov. 16, 2006, 7 pps.

U.S. Appl. No. 17/114,058, filed Dec. 7, 2020.

* cited by examiner

SECURE ENCRYPTION OF PARTIAL BLOCKS

FIELD OF THE INVENTION

The disclosure relates generally to the encryption of digital data. The disclosure relates particularly to the encryption of partial data blocks.

BACKGROUND

Block data encryption methods divide target plaintext data into regularly sized data blocks and then apply the encryption algorithm to each block. As the plaintext may not include a complete number of data blocks, leaving a remainder of plaintext. Typical block encryption methods fill the last data block with the remainder and the necessary number of zeros to complete the block.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable secure encryption of storage blocks partially filled with plaintext.

Aspects of the invention disclose methods, systems and computer readable media associated with encrypting data blocks by receiving blocks of compressed data, determining a size, in bytes, of the compressed data, appending a trailer to the compressed data, the trailer associated with the size in bytes of the compressed data, encrypting the compressed data and trailer, yielding encrypted data, where a header of the encrypted data comprises a number of complete encrypted data blocks, and providing the encrypted data to a user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
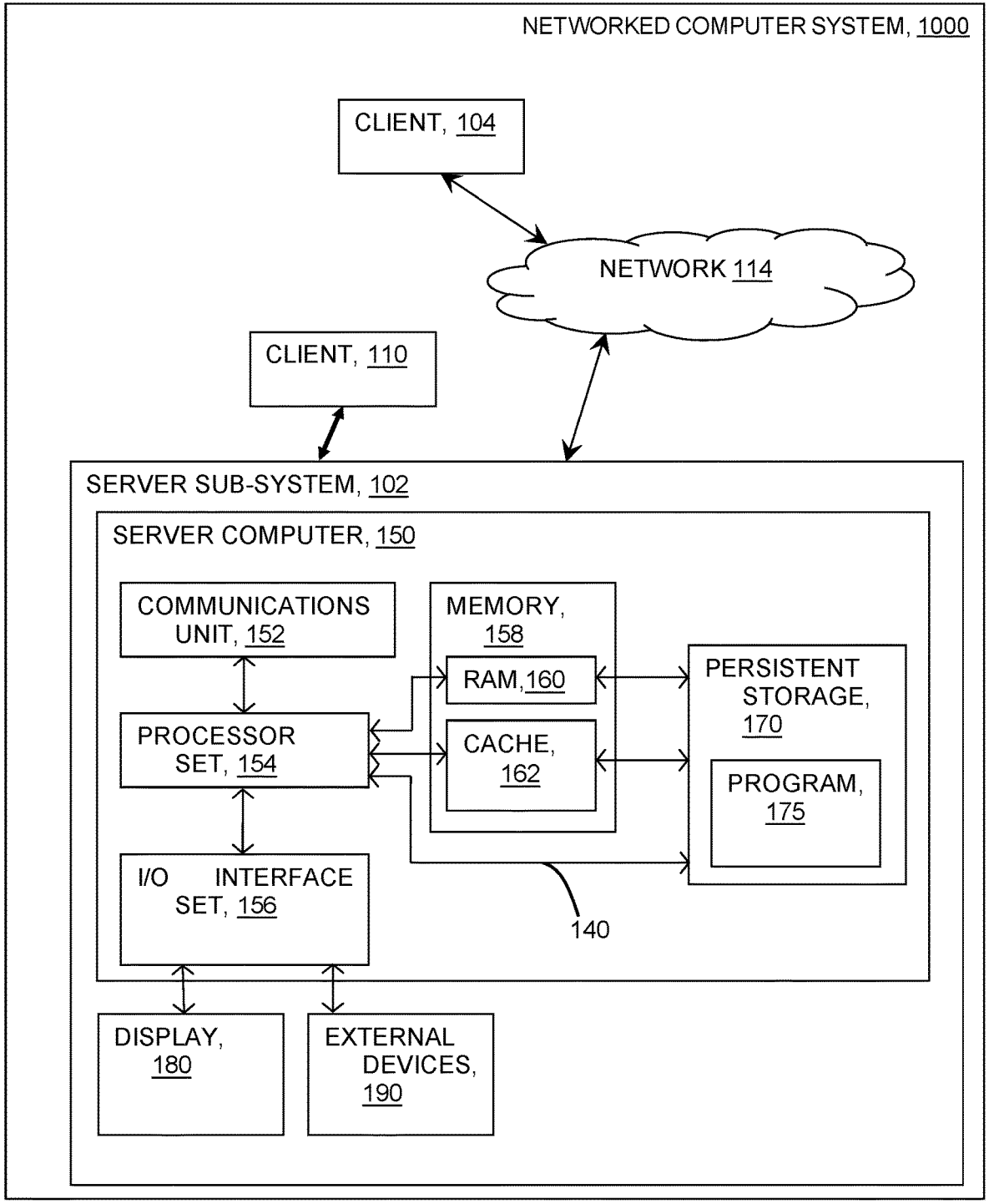
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Deterministic encryption is weak in its ability to protect low entropy plaintext. Disclosed embodiments provide ways to protect low entropy plaintext input. An example of a low entropy plaintext would be created by a file system that went to store a file which was N+1 bytes long to a fixed block storage system which stores data in fixed length sectors (e.g. 512 or 4096 bytes). If N is evenly divisible by the sector length, this means that the final byte of the file spills into the last sector required to record it—which is to say the final sector only contains one byte.

Advanced Encryption Standard (AES) is a block encryption technique which encrypts 16 bytes (i.e. an AES block) at a time. Many encryption modes of AES (e.g. ECB, CBC, CFB, OFB, XEX, etc.) always produce some integer number of 16-byte blocks of ciphertext. Encryption mode XTS uses Ciphertext Stealing, which allow encryption of any integer number (greater than or equal to 16) of bytes to be encrypted to the same number of ciphertext bytes. To efficiently decrypt XTS, one must know the exact length of the ciphertext to be decrypted. An encryption mode, such as deterministic use of XTS-AES, which creates a fixed ciphertext block output for a given key and 16-byte AES block input, is potentially weak if the attacker has access to an encryption oracle (i.e. can cause encryption with the key to occur and can collect the resultant ciphertext output).

To reduce the granularity of the 'leaked' compressibility information disclosed embodiments append bytes to received data prior to encryption. Knowing the exact number of bytes, the fixed block sector (e.g. 4 KB) compressed down to is clearly more revealing than if one only knew the number of bytes rounded up modulo 16 (e.g. if the final AES block contained 1, 2, . . . 16 bytes).

For example, if an attacker knows that there may be only one byte of 'content' in an AES block, and that in that case the remaining 15 bytes of that AES block will be filled with a known value (e.g. Zero Pad), then the attacker with access to an encryption oracle can create the ciphertext that would be created for all 256 possible values of that one byte, which will create 256 ciphertext outputs (each 16 bytes long). If the attacker sees one of the 256 ciphertext values (at the expected offset into the resultant ciphertext), the attacker will know what plaintext byte was encrypted.

One use case which calls for deterministic encryption is the extensions imagined to Length Preserving Compression (LPC), to enable data deduplication. One such extension is called opportunistic deduplication, which calls for using convergent encryption (a form of deterministic encryption) of sufficiently compressible data. In the most basic form of LPC, all pad out of the last block is with zeroes, to maximize the ability of a downstream compression engine to achieve the maximum compression ratio possible (which is effectively just stripping zeroes). In the case where the compressed plaintext being encrypted includes one (or only a few) byte(s) spilling into the last AES block to be encrypted, that last byte(s) might be easily determined using the attack cited above. Disclosed embodiments enable improvements to the security of encrypting the bytes of plaintext data in the last partial data block.

Disclosed embodiments enhance the security of encrypted data by filling out a partial data block with an intra-block length value and a non-zero-pad (NZP) prior to encryption of the block. This manner of filling out the partial block reduces the effectiveness of attacks intended to discern the plaintext of the partial data block.

In an embodiment, methods enhance the security of encrypted data by receiving blocks of compressed data, determining a byte size—the size in bytes—of the compressed data, and appending a trailer to the compresses data (the trailer associated with the determined byte size of the compressed data). In this embodiment, the method further encrypts the compressed data and appended trailer, yielding encrypted data. A header of the encrypted data includes the number of complete encrypted data blocks of the encrypted data.

Aspects of the invention provide an improvement in the technical field of data encryption. Conventional encryption pads a last partial data block with zeros to ease data compression tasks. This manner of filling the last partial block reduces the security of the plaintext carried in the last data block. Adding an intra-block length value and a non-zero-pad provides a full block for encryption, rather than the incomplete block of plaintext and a remainder of zero padding. The encryption of a full block including the NZP yield a ciphertext less susceptible to attack.

Aspects of the invention also provide an improvement to computer functionality. In particular, implementations of the invention are directed to a specific improvement to the way encryption systems such as AES encryption, operate. Disclosed embodiments enhance the security of the encrypted plaintext by eliminating ciphertext artifacts arising from the use of all zeros to pad out partial data blocks.

In an embodiment, one or more components of the system can employ hardware and/or software to solve problems that are highly technical in nature (e.g., modifying partial data blocks to include an intra-block length value, a partial block of plaintext, and a non-zero-pad, encrypting the filled data block, etc.). These solutions are not abstract and cannot be performed as a set of mental acts by a human due to the processing capabilities needed to facilitate secure encryption of partial data blocks. Further, some of the processes performed may be performed by a specialized computer for carrying out defined tasks related to encryption methods. For example, a specialized computer can be employed to carry out tasks related to filling and encrypting partial data blocks or the like.

In an embodiment, the method receives compressed ciphertext data, the method may receive uncompressed ciphertext data and subsequently compress the ciphertext data. After compression, the method determines the number of bytes of the compressed data, the byte size of the compressed data, and determines the number of bytes, 0-15, in the last block of the compressed data. In this embodiment, for data having a compressed data length equally divisible by the encryption block length, the method appends a single byte trailer to the compressed data, with four bits of the trailer set to 0000, indicating that zero bytes in the last block of the compressed data are part of the ciphertext. For data having a CDL not divisible by the block length, the method appends additional bytes and the single byte trailer, to complete the last block. Four bits of the trailer are set to a value between 0001, and 1111, to indicate the number of bytes of the last block which are part of the compressed data.

In an embodiment, the padding data comprises non-deterministic (random) data for compressed data streams having a CDL of fewer than M blocks. For compressed data having a CDL of greater than M blocks, the padding comprises deterministic data, such as a portion of a keyed hash function output used as the encryption initiation vector (IV).

In an embodiment, the method appends one or more blocks of non-deterministic data to the compressed data such that the total number of data blocks equals a defined block threshold of M AES blocks, in addition to the trailer. In this embodiment, the last appended block includes fifteen bytes of non-deterministic data and the single byte trailer described above. In this embodiment, four bits of the trailer indicate the number of additional padding blocks added to the compressed data. In this embodiment, the remaining four bits of the trailer indicate the number of bytes of the last block prior to the added padded blocks which comprise compressed data.

The compressed data, padding blocks, if any, and final block with the trailer are then encrypted using the selected encryption function. The method determines the number of encrypted blocks. This block count is then provided as part of a two-byte header appended to the blocks of ciphertext together with the encryption initiation vector. The method then provides the ciphertext, header, and IV to the user.

In an embodiment, a method departs from a simple form of length preserving compression (LCP) to secure the case where the last AES block is only partially filled. Specifically, whenever the actual length of compressed data only fills 15 or fewer bytes of the last 16-byte AES block to be recorded, the method handles that block differently. As an example, an LPC's Length (L) field is set to N+1 where N is the integer number of fully filled AES blocks, and the '1' is effectively a flag which indicates that the last AES block is only partially filled. the invention extends the LPC so that this last AES block is formatted as follows: 1) an Intra-Block Length (IBL) field which represents the exact number (1 to 15) of compressed data bytes which have been input to this AES block. The IBL could be as short as 4 bits (which can thus represent 16 values), though the simplest form of this would be to use an IBL field which is 1 byte long. 2) The IBL field would then be followed by the 15 or fewer Plaintext (P) bytes. 3) The P bytes would be followed by 0 to 14 bytes of non-zero padding (NZP). Different embodiments utilize different possibilities for what the NZP bytes as discussed below.

In an embodiment, a method for encrypting data includes dividing N+1 bytes of data into data blocks where N is equally divisible by the block size. For an embodiment including the use of length preserving compression (LCP), the method requires storage of a data chunk of up to 4 KB in a 4 KB fixed block storage sector. The method fills the 4 KB sector with L, a 2 byte field representing or indicating the length of the compressed plaintext to be encrypted, CPT, the compressed plaintext which is in the range of 1 to 4094-T bytes long, where T represents the minimum length of a zero pad to fill the sector. In an embodiment, CPT falls in the range 1 to 4096-T bytes, where T represents a combination of 2 bytes for L and 16 bytes for the sector zero pad. In an embodiment, the plaintext may not be sufficiently compressible to fall within the defined CPT range or leave sufficient space for the ZP. In this embodiment, the method encrypts the plaintext directly (i.e. without intermediate data compression) using an encryption mode that does not expand the plaintext such that the encrypted ciphertext fits within the sector.

In an embodiment, for any value between 1 and 4094-T, the last 16 byte block of the sector will typically (15/16 of the time) be only partially filled with plaintext. The method then fills the remainder of this last block with the NZP. In an embodiment, the method evaluates the CPT value to determine whether the last block including plaintext will be fully or partially filled. In an embodiment, the method evaluates the last block including plaintext data to determine if that block is fully or partially filled with plaintext data.

In disclosed embodiments, the last plaintext block of foe AES using an LPC scheme includes an NZP of between 1 and 15 bytes. In an embodiment, the method generates a random number having the necessary number of bytes and fills the last AES block with the randomly generated value. In this embodiment, the NZP offers security due to the random nature of the NZP value. Such a random NZP value offers little or nothing in terms of data deduplication opportunities as identical plaintext data would have a very high probability of having differing randomly generated NZP values.

In an embodiment, the method derives the necessary 1-15 bytes for the NZP from a keyed hash of the plaintext of full blocks of the current storage sector. The method uses the same key slated for use in encrypting the plaintext together with an appropriate hashing function, such as SHA 256, to derive the hashed value. In an embodiment, the key constitutes a public key of a public-private key pair, where the recipient retains the private key to be used to decrypt the received AES encrypted data sectors. The method then truncates the hashed value to the necessary number of bytes required for the NZP to fill the last partially filled data block. In this embodiment, the method may generate a keyed hash of all full blocks of the current sector (i.e. those blocks associated with the last partially filled block). In this embodiment, the method may generate the keyed hash value using any number of the associated blocks from 1 to N, where N represents the complete number of filled data blocks associated with the last partially filled block.

In an embodiment, the method derives the NZP from a keyed hash value generated using the encryption key and a portion of the ciphertext generated by encrypting full blocks associated with the last partial block. In this embodiment, the method may generate the keyed hash value using anywhere from 1 to N full blocks of ciphertext, where N represents the complete number of full blocks associated with the last partially filled block. In this embodiment, the method truncates the generated keyed hash value to the number of bytes necessary for the NZP to completely fill the last partially filled data block.

In an embodiment, the method generates the NZP from a keyed hash value of all plaintext of the current sector (i.e. the plaintext from full blocks of the sector plus the plaintext from the last partially filled block. In this embodiment, the method may use the plaintext from the last partial block plus the plaintext from anywhere between 1 and N blocks of the sector, where N represents the complete number of full data blocks of the sector. The method may use blocks beginning with the first full block and continuing forward or beginning with the last full block and continuing backward, to generate the keyed hash value. For example, the method may use the plaintext from the first full block plus M additional full blocks, where M is between 0 and N−1, plus the last block partial plaintext. As another example, the method may generate the keyed hash value from the plaintext of the last partially filled data block plus the last full data block before the partially filled data block plus M additional data blocks counting back from the last full block, where M ranges between 0 and N−1. In this embodiment, the method truncates the keyed hash value as necessary to fill the last partially filled data block.

In an embodiment, the method uses a remainder portion of a hashed keyed value generated as an initialization vector (IV) for the AES encryption. As an example, the IV=hk=hash (Kd∥P) where Kd constitutes the key and P constitutes the plaintext used in generating the IV. In this embodiment, the method uses 12 bytes of the generated value as the IV, while the hash function, such as SHA 256, generates a 32-byte output value. In this embodiment, the method uses as many of the remaining 20 bytes of the generated value as needed to fill the partially full last data block.

In an embodiment, after filling the last partially filled data block of the sector with an appropriate NZP, the method encrypts the last data block using AES and an IV generated as described above. In this embodiment, the method provides the ciphertext generated by encrypting the last data block to the set of ciphertexts generated by encrypting the other data blocks of the sector. The method provides the complete set of ciphertexts for distribution to one or more recipients of the encrypted data. In this embodiment, the one or more recipients receive the set of ciphertexts and decrypt the ciphertexts using a private key of the public private key pair.

In an embodiment, after filling the partially data block with the IBL length value and the NXP, the method proceeds to encrypt the data blocks. In an embodiment, the method encrypts the data blocks associated with the partial block prior to filling the partial block and uses at least a portion of the ciphertext of these blocks in generating the NZP.

In an embodiment, the method uses a wide block encryption to encrypt all the data blocks of the sector as a whole, reducing the effectiveness of attacks based upon a final data block containing only a partial amount of plaintext. In this embodiment, the method uses encryption such as wide block encryption such as encrypt mix encrypt 2 EME2 to encrypt the set of data blocks.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data encryption program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data encryption program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data encryption program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
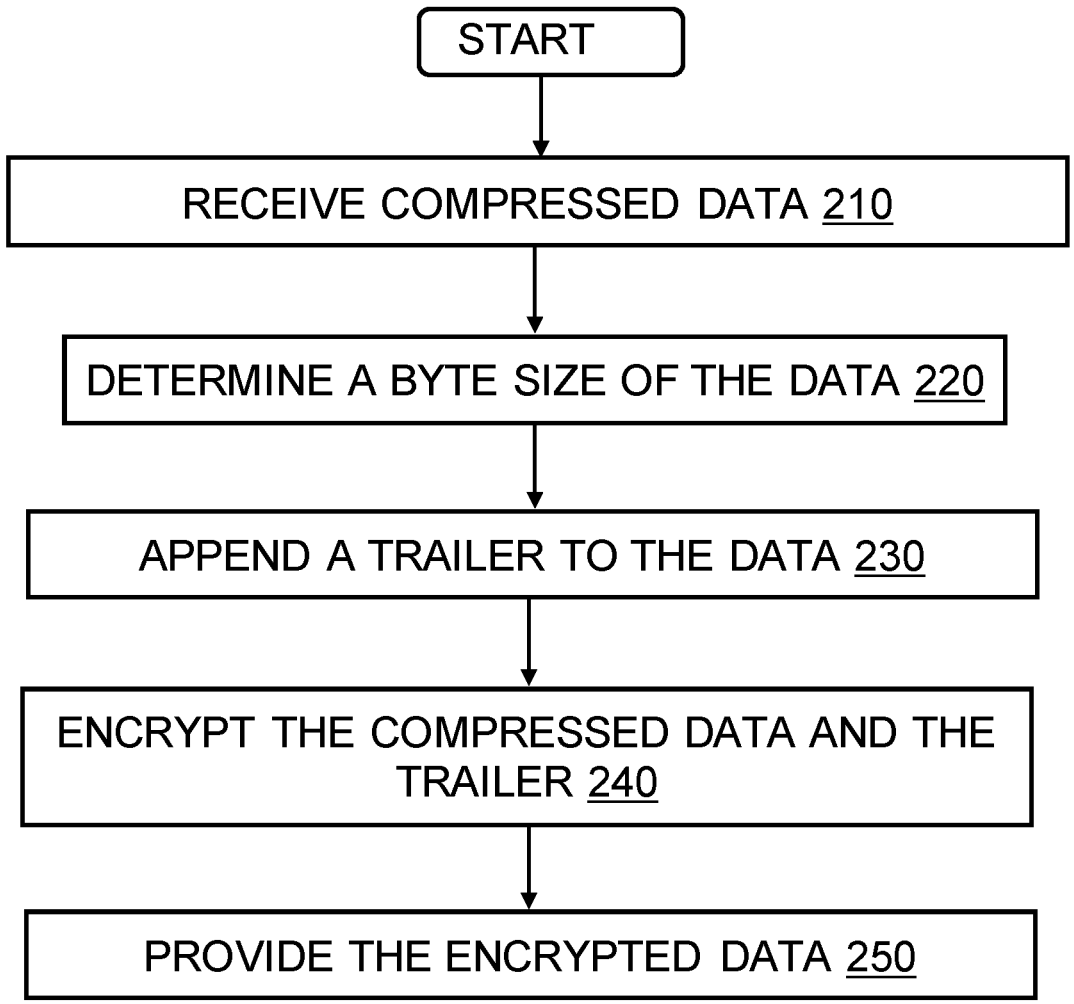
FIG. 2 provides a flowchart depicting an operational sequence, according to an embodiment of the invention.

FIG. 2 provides a flowchart 200, illustrating exemplary activities associated with the practice of the disclosure. After program start, at block 210, data encryption program 175 executing on one or more processors such as those illustrated in FIG. 1, receives compressed or uncompressed plaintext data. For uncompressed plaintext data, the method preforms a data compression routine yielding compressed plaintext data. At block 220, the method determine a byte size of the compressed data including determining the number of compressed data bytes present in a last block of the compressed data. As an example, the method divides the total number of compressed data by a block byte size to determine the number of complete blocks of compressed data as well as the number of bytes in a final partial block of compressed data. At block 230, the methods modifies the partial data blocks by adding a trailer indicating the number of bytes in the partial data block, to the plaintext of the partial data block.

In an embodiment, the method appends an intra-block length value, intra-block length value constitutes a 2 byte value for the plaintext length. In addition to the intra-block length field and the plaintext, the method fills the remainder of the partial block with a non-zero padding. The non-zero padding may constitute a generated random number, a keyed hash of plaintext from the other blocks of the sector which are associated with the partial block, a keyed hash of the ciphertext of the other blocks of the sector which are associated with the partial block, or a remainder of a keyed hash value generated as an initialization vector for an encryption function used by the method.

At block 240, the method encrypts the combined compressed data and appended trailer. In an embodiment, the method appends additional data blocks to the compressed data to satisfy a minimum data block threshold requirement for the encryption algorithm. In an embodiment, the method uses a block encryption program to encrypt each block to the sector individually. In an embodiment, the method uses a wide block encryption program to encrypt all the blocks of the sector as a set.

At block 250, the method provides the encrypted data, plus an external header including an indication of the total number of encrypted blocks, and an encryption initiation vector, to a user. As an example, the provided encrypted data comprises the format: header; IV; ciphertext; zero-pad, where the zero-pad constitutes blocks of data sufficient to fill an encryption algorithm output sizing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
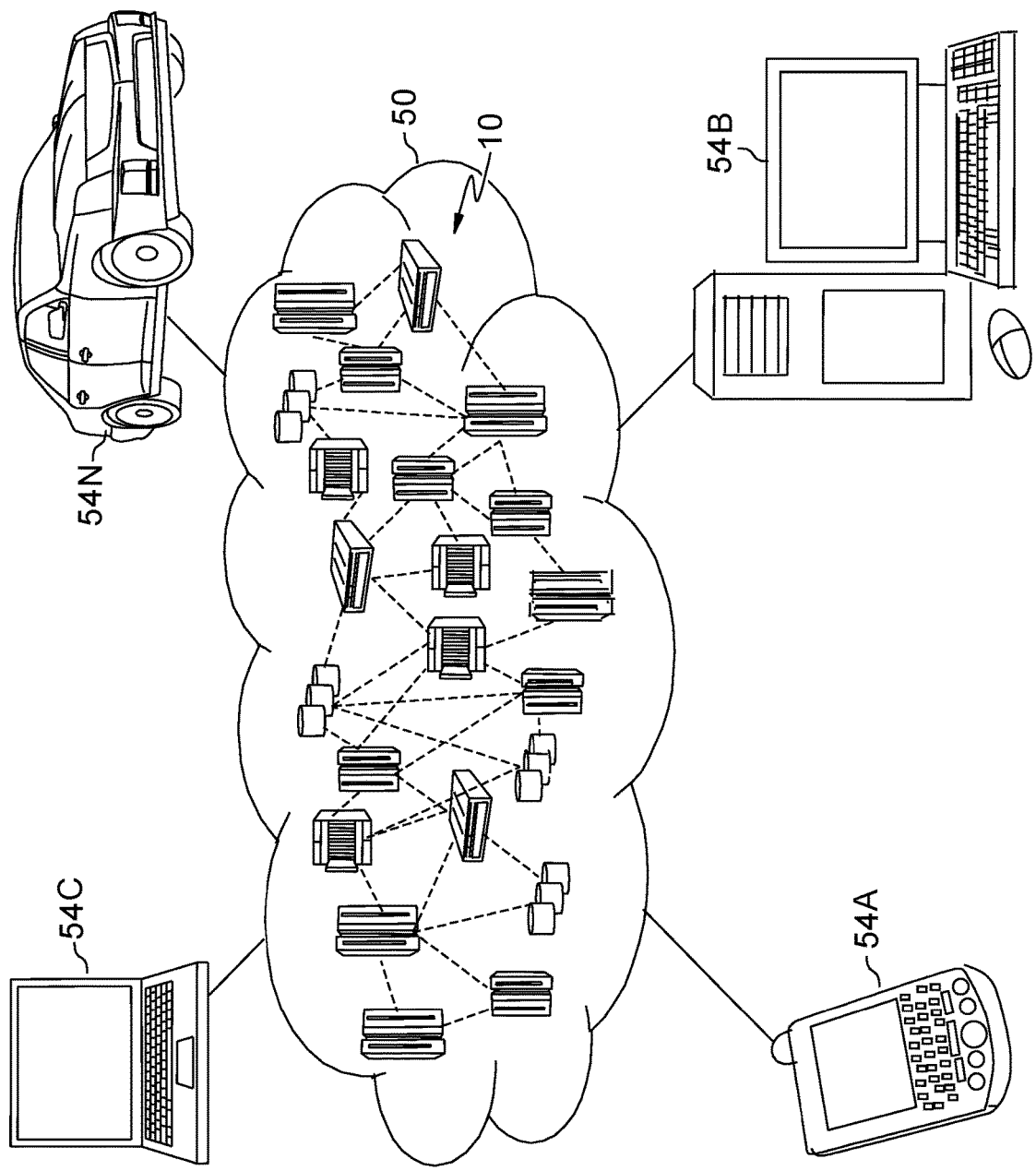
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
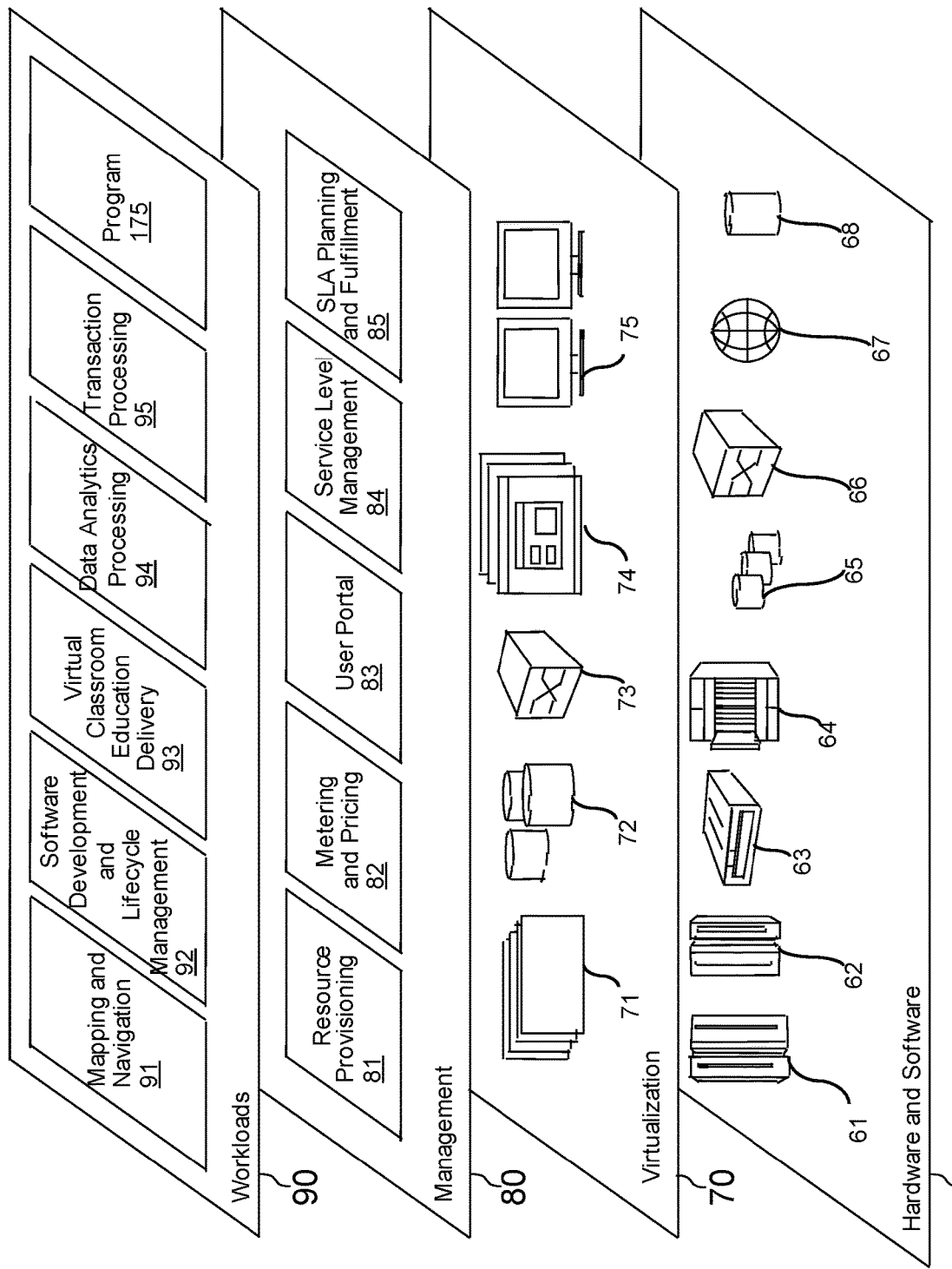
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A computer implemented method for encrypting data blocks, the method comprising:
   receiving, by one or more computer processors, blocks of compressed data;
   determining, by the one or more computer processors, a size, in bytes, of the compressed data;
   identifying, by the one or more computer processors, a first storage block partially filled with plaintext, according to the size in bytes of the compressed data
   modifying, by the one or more computer processors, the first storage block partially filled with plaintext to include:
      a trailer including an intra-block length field representing the number of plaintext data bytes in the first storage block,
      the plaintext, and
   a non-zero padding sufficient to fill the first storage block;
   encrypting, by the one or more computer processors, the compressed data and trailer, yielding encrypted data, wherein a header of the encrypted data comprises a number of complete encrypted data blocks; and
   providing, by the one or more computer processors, the encrypted data to a user.

2. The computer implemented method according to claim 1, wherein the non-zero padding comprises non-deterministic data.

3. The computer implemented method according to claim 1, wherein the non-zero padding comprises deterministic data associated with at least a portion of the compressed data.

4. The computer implemented method according to claim 1, further comprising appending, by the one or more computer processors, at least one block of data to the compressed data, the at least one block comprising the trailer.

5. The computer implemented method according to claim 4, further comprising appending, by the one or more computer processors, sufficient blocks of data to satisfy a data block threshold.

6. The computer implemented method according to claim 1, wherein encrypting the first storage block comprises encrypting the first storage block and all storage blocks associated with the first storage block using a wide block encryption function.

7. A computer program product for encrypting data blocks, the computer program product comprising one or more computer readable storage devices and collectively stored program instructions on the one or more computer readable storage devices, the stored program instructions comprising:
   program instructions to receive blocks of compressed data;
   program instructions to determine a size, in bytes, of the compressed data;
   program instructions to identify a first storage block partially filled with plaintext;
   program instructions to modify the first storage block partially filled with plaintext to include:
      a trailer including an intra-block length field representing the number of plaintext data bytes in the first storage block,
      the plaintext, and
      a non-zero padding sufficient to fill the first storage block;
   program instructions to encrypt the compressed data and trailer, yielding encrypted data, wherein a header of the encrypted data comprises a number of complete encrypted data blocks; and
   program instructions to provide the encrypted data to a user.

8. The computer program product according to claim 7, wherein the non-zero padding comprises a generated random number.

9. The computer program product according to claim 7, wherein the non-zero padding comprises a deterministic data associated with at least a portion of the compressed data.

10. The computer program product according to claim 7, the stored program instructions further comprising program instructions to append at least one block of data to the compressed data, the at least one block comprising the trailer.

11. The computer program product according to claim 10, the stored program instructions further comprising program instructions to append sufficient blocks of data to satisfy a data block threshold.

12. The computer program product according to claim 7, wherein encrypting the first storage block comprises encrypting the first storage block and all storage blocks associated with the first storage block using a wide block encryption function.

13. A computer system for encrypting data blocks, the computer system comprising:
   one or more computer processors;
   one or more computer readable storage devices; and
   stored program instructions on the one or more computer readable storage devices for execution by the one or more computer processors, the stored program instructions comprising:
   program instructions to receive blocks of compressed data;
   program instructions to determine a size, in bytes, of the compressed data;
   program instructions to identify a first storage block partially filled with plaintext;
   program instructions to modify the first storage block partially filled with plaintext to include:
   a trailer including an intra-block length field representing the number of plaintext data bytes in the first storage block,
   the plaintext, and
   a non-zero padding sufficient to fill the first storage block;
   program instructions to encrypt the compressed data and trailer, yielding encrypted data, wherein a header of the encrypted data comprises a number of complete encrypted data blocks; and
   program instructions to provide the encrypted data to a user.

14. The computer system according to claim 13, wherein the non-zero padding comprises a generated random number.

15. The computer system according to claim 13, wherein the non-zero padding comprises a deterministic data associated with at least a portion of the compressed data.

16. The computer system according to claim 13, the stored program instructions further comprising program instructions to append at least one block of data to the compressed data, the at least one block comprising the trailer.

17. The computer system according to claim 13, wherein encrypting the first storage block comprises encrypting the first storage block and all storage blocks associated with the first storage block using a wide block encryption function.

* * * * *